United States Patent [19]

Shiroyama et al.

[11] Patent Number: 4,611,257

[45] Date of Patent: Sep. 9, 1986

[54] VIBRATION CONTROLLED DATA TRANSFER APPARATUS WITH A DOUBLE SIDED FLEXIBLE MAGNETIC DISK

[75] Inventors: Kazuhiko Shiroyama; Tamotsu Haraguchi, both of Musashino; Yoshiaki Sakai, Higashikurume, all of Japan

[73] Assignee: Teac Corporation, Tokyo, Japan

[21] Appl. No.: 524,364

[22] Filed: Aug. 18, 1983

[51] Int. Cl.[4] .............................................. G11B 5/48
[52] U.S. Cl. ..................................... 360/104; 360/99
[58] Field of Search ...................... 360/104, 105–106, 360/109

[56] References Cited

U.S. PATENT DOCUMENTS

| | | | |
|---|---|---|---|
| 3,879,757 | 4/1975 | Elliott et al. | 360/99 |
| 4,151,573 | 4/1979 | Tandon et al. | 360/104 |
| 4,208,684 | 6/1980 | Janssen et al. | 360/104 |
| 4,216,505 | 8/1980 | Grant et al. | 360/104 |
| 4,288,824 | 9/1981 | Watanabe | 360/104 X |
| 4,347,535 | 8/1982 | Dalziel | 360/104 X |
| 4,389,688 | 6/1983 | Higashiyama | 360/104 |
| 4,516,231 | 5/1985 | Michaelis | 369/44 |

Primary Examiner—John H. Wolff
Attorney, Agent, or Firm—Woodcock Washburn Kurtz Mackiewicz & Norris

[57] ABSTRACT

A device for the recording and/or reproduction of data with use of a flexible magnetic disk, or a floppy disk, having information bearing surfaces on both sides. A pair of transducer heads are disposed on both sides of the rotatably supported disk for movement substantially in its radial direction in data transducing contact with its opposite surfaces. One of the heads is gimbal mounted on a carriage slidably mounted on guide rails whereas the other head is gimbal mounted on a carrier arm which is spring mounted on, and biased toward, the carriage. A vibration control system is mounted on the carrier arm in order to minimize its audible resonant vibration due to the data transducing contact of the transducer heads with the magnetic disk. Typically the vibration control system comprises a metal-made, inverted-U-shaped shielding plate mounted on the carrier arm via bodies of rubber or the like in overlying relation to the transducer head carried by the carrier arm.

11 Claims, 5 Drawing Figures

VIBRATION CONTROLLED DATA TRANSFER APPARATUS WITH A DOUBLE SIDED FLEXIBLE MAGNETIC DISK

BACKGROUND OF THE INVENTION

Our invention relates generally to apparatus for the recording and/or reproduction of information with use of flexible magnetic disks, sometimes referred to as floppy disks, which are usually housed in protective envelopes or jackets. More specifically the invention pertains to such apparatus intended for use with double sided magnetic disks, that is, those having information bearing surfaces on both sides.

Flexible magnetic disks have found extensive acceptance in information processing and allied industries as compact data storage media. Being thin and limply flexible, the disks are commonly enclosed in more rigid, apertured envelopes to make up disk assemblies or cartridges that are self supporting.

It has recently been suggested to use both sides of the flexible magnetic disk for data storage, with a view primarily to higher capacity. Data storage devices for use with such double sided disks have also been proposed. Examples are Elliott et al. U.S. Pat. No. 3,879,757 and Tandon et al. U.S. Pat. No. 4,151,573. Another example is found in Noda U.S. patent application Ser. No. 434,400 filed Oct. 14, 1982.

Generally, in such double sided disk data storage systems, the generally opposed pair of transducer heads have their gapped surfaces machined to a mirrorlike finish for positive data transfer contact with the opposite faces of the disk. As the disk surfaces become smoother through use, the transducer heads make even closer contact therewith mechanically. Thus, during data transfer operation, the so called "stick slip" phenomenon takes place between transducer heads and magnetic disk. This phenomenon may give rise to the audible resonant vibration of the cantilevered carrier arm carrying one of the transducer heads, depending upon the material of which the carrier arm is made.

The other transducer head is usually gimbal mounted on a carriage which slides along guide rods and which is therefore free from audible resonant vibration. The carrier arm, however, is cantilevered on the carriage and sprung to bias the first mentioned transducer head into forced contact with the magnetic disk. The carrier arm is therefore far easier to vibrate by resonance. It is of course possible to reduce the audible vibration of the carrier arm by molding it from ABS (acrylonitrile-butadiene-styrene copolymer) resin or other comparatively pliant synthetic resins. However, the use of more rigid materials such as polyphenylene sulfide (PPS) is desirable to fabricate the carrier arm to very stringent dimensional tolerances and to improve other physical properties. In such cases the audible resonant vibration of the carrier arm has been almost unavoidable.

SUMMARY OF THE INVENTION

Our invention has it as an object, in double sided disk data storage apparatus of the type under consideration, to minimize the audible resonant vibration of the carrier arm carrying one of the pair of transducer heads.

Another object of our invention is to attain the first recited object while at the same time effectively shielding the magnetic transducer head on the carrier arm.

A further object of our invention is to make utmost use of the existing parts of the apparatus and to realize the foregoing objects without alteration of the usual construction of the apparatus.

Our invention may be summarized as a data transfer apparatus for use with a double sided thin flexible magnetic disk. Included is a first transducer head mounted on a carriage for movement therewith substantially radially of the magnetic disk while being in data transducing contact with one of the opposite recording surfaces of the disk. A second transducer head is disposed opposite to the first transducer head and carried by a carrier arm which is supported by resilient means for simultaneous movement with the carriage in the same direction therewith. The resilient means acts on the carrier arm to bias the second transducer head into data transducing contact with the other recording surface of the magnetic disk. For suppressing the resonant vibration of the carrier arm a member of rigid material is mounted thereon via an elastic mount.

Usually, as has been stated, the first and second transducer heads have their gapped surfaces machined to a mirrorlike finish, tending to make unduly close contact with the magnetic disk, with the consequent stick slip therebetween in the operation of the apparatus. According to our invention, however, the rigid member and the elastic mount constitute in combination a vibration control system capable of effectively opposing and dampening the audible resonant vibration of the carrier arm due to the stick slip between transducer heads and magnetic disk.

In a preferred embodiment the rigid member takes the form of a generally flat metal member mounted on the carrier arm via a pair of bodies of elastomer so as to cover the transducer head on the carrier arm. Thus the rigid member serves the dual purpose of inhibiting the resonant vibration of the carrier arm and shielding the transducer head thereon.

The above and other objects, features and advantages of our invention and the manner of attaining them will become more apparent, and the invention itself will best be understood, from a study of the following description and appended claims, with reference had to the attached drawings showing an exemplary embodiment of our invention.

DESCRIPTION OF THE PREFERRED EMBODIMENT

Figure 1:
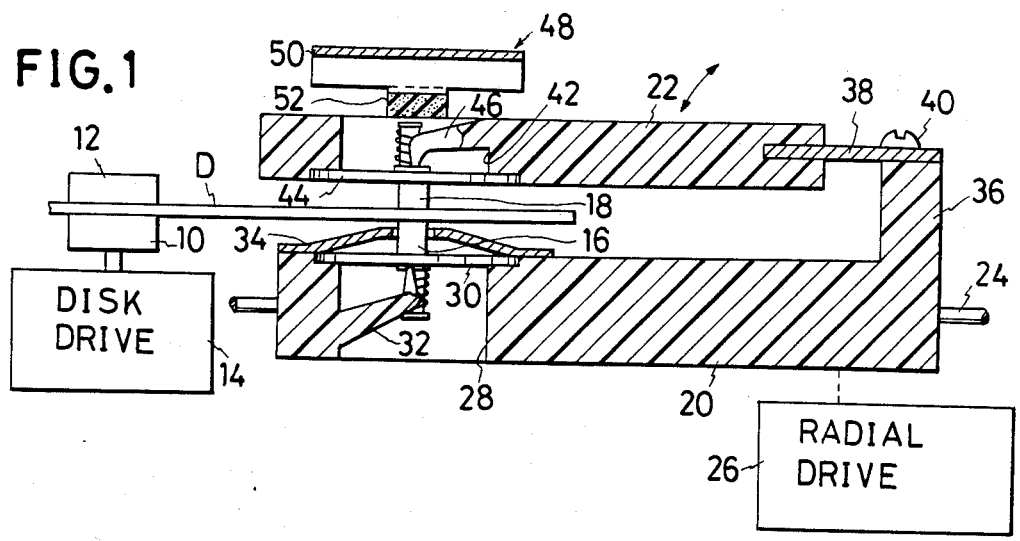
FIG. 1 is a partial vertical section through the data transfer apparatus constructed in accordance with our invention, the apparatus being shown together with a double sided flexible magnetic disk mounted in position thereon for data transducing operation, the magnetic disk being shown fragmentarily for illustrative convenience.

We will now describe the exemplified data transfer apparatus of our invention in detail, but only insofar as is necessary for a full understanding of the invention. With reference first to FIG. 1 in particular, the apparatus is shown together with a flexible magnetic disk or disk carriage D having magnetic recording surfaces on its opposite sides. The magnetic disk D is shown supported in its working position in the apparatus by being caught centrally between drive hub assembly 10 and clamp assembly 12. The drive hub assembly 10 is coupled to a disk drive mechanism 14 for imparting rotation to the magnetic disk D.

As will be noted from FIG. 1, we pressuppose use of the exemplified data transfer apparatus in a recumbent, rather than an upstanding, attitude. The magnetic disk D is therefore shown supported horizontally in the apparatus. We will use directional terms such as "upward" and "downward", as well as "upper" and "lower", in reference to this recumbent attitude of the apparatus depicted in FIG. 1.

The apparatus has a first or lower transducer head 16 and a second or upper transducer head 18 which are disposed in generally opposed relation to each other for data transducing contact with the opposite recording surfaces of the magnetic disk D. We assume that the gapped surfaces of these transducer heads 16 and 18 have been machined to a mirrorlike finish for proper data transducing contact with the magnetic disk D. The lower transducer head 16 is mounted on a carriage 20 whereas the upper transducer head 18 is mounted on a carrier arm 22 which is cantilevered on the carriage 20. Both carriage 20 and carrier arm 22 can be molded from PPS. Being of extremely high hardness, PPS makes possible the fabrication of these parts to very close dimensional tolerances.

The carriage 20 is slidably mounted on a pair of guide rods 24, one seen, for movement substantially in a radial direction of the magnetic disk D. The word "substantially" is used because the traveling direction of the carriage 20, or of the transducer heads 16 and 18, may or may not be exactly radial of the magnetic disk D. A conventional radial drive mechanism 26 including a stepper motor is coupled to the carriage 20 for moving the same along the guide rods 24 in relation to the controlled rotation of the magnetic disk D by the disk drive mechanism 14.

The carriage 20 is apertured vertically therethrough at 28 in the vicinity of one end thereof. Mounted at the top end of the aperture 28 is a relatively heavy disklike gimbal spring 30 supporting thereon the lower transducer head 16 directed upwardly therefrom. The carriage 20 is formed to include an arm 32 projecting into the aperture 28 to provide a pivot for the gimbal spring 30. Over the gimbal spring 30 a shield 34 for the lower transducer head 16 is fixedly mounted on the carriage 20. For the best results the shield 34 can be made from Permalloy (trademark for a nickel-iron alloy). Frustoconical in shape, the shield 34 is bored centrally therethrough to allow the lower transducer head 16 to extend upwardly therethrough. The frustoconical shape of the shield 34 is intended to facilitate the loading of the magnetic disk or disk cartridge D onto the apparatus.

The carriage 20 has an upturned flange 36 on its end away from the lower transducer head 16. The aforesaid carrier arm 22 is mounted on this upturned flange 36 of the carriage 20 via a cantilever spring 38.

Figure 2:
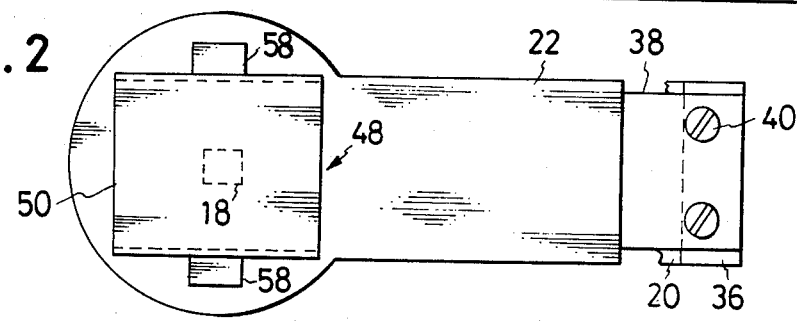
FIG. 2 is a top plan of the carrier arm, vibration control system, etc., in the apparatus of FIG. 1.

As shown also in FIG. 2, the cantilever spring 38 has one of its ends screwed at 40 to the carriage flange 36 and the other end embedded in the proximal end of the carrier arm 22. The cantilever spring 38 performs the dual function of pivotally supporting the carrier arm 22 on the carriage 20 and biasing the carrier arm toward the carriage.

During the insertion and withdrawal of the magnetic disk or disk cartridge D into and out of the apparatus, the carrier arm is pivoted away from the carriage 20 as by a solenoid, not shown, against the bias of the cantilever spring 38. Upon full insertion of the disk cartridge into the apparatus the unshown solenoid allows the carrier arm to pivot toward the carriage 20 by the force of the cantilever spring 38, thereby causing engagement or "landing" of the upper transducer head 18 on the upper recording surface of the magnetic disk D as in FIG. 1.

The carrier arm 22 has an aperture 42 formed therethrough in the vicinity of its distal end. This aperture 42 is in vertical register with the aperture 28 in the carriage 20 when the carrier arm 22 is held pivoted toward the carriage. Closing the bottom end of the aperture 42 is a disklike gimbal spring 44 supporting thereon the upper transducer head 18 oriented downwardly therefrom. The gimbal spring 44 is thinner and in consequence less stiff than the other gimbal spring 30 supporting the lower transducer head 16. The carrier arm 22 has an integral arm 46 projecting into the aperture 42 to provide a pivot for the gimbal spring 44.

With reference to FIGS. 1 through 4 the reference numeral 48 generally denotes a vibration control system for suppressing the audible resonant vibration of the carrier arm 22 in accordance with the novel concepts of our invention. Although the vibration control system in accordance with the broader aspect of our invention comprises a rigid member mounted on the carrier arm 22 via an elastic mount, the particular vibration control system 48 of the illustrated embodiment comprises a metal-made shield 50 and a pair of bodies 52 of elastic material, with the latter serving as the elastic mount for supporting the former on the carrier arm. We particularly recommend Permalloy for the shield 50, and solid neoprene for the elastic bodies 52.

Figure 5:
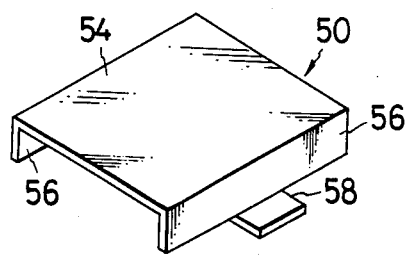
FIG. 5 shows in perspective the rigid member or head shield constituting a part of the vibration control system.

As pictured in perspective in FIG. 5, the shield 50 is of approximately inverted U shaped cross section, comprising a flat major portion 54 and a pair of opposed side rims 56 bent right angularly from both sides of the major portion.

Figures 3, 4:
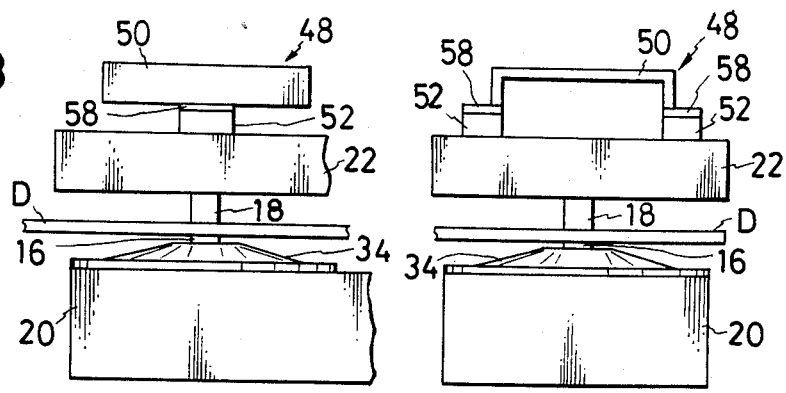
FIG. 3 is a fragmentary side elevation of the carriage, carrier arm, transducer heads, vibration control system, etc., in the apparatus of FIG. 1.
FIG. 4 is an elevation showing the means of FIG. 3 as seen from their left hand side in that drawing.

FIG. 4 best reveals that the shield 50 is further formed to include a pair of lugs 58 projecting from the midportions of the lower edges of its side rims 56 away from each other. These lugs 58 are bonded to the respective elastic bodies 52, which in turn are bonded to the top surfaces of the carrier arm 22 in transversely spaced apart positions thereon. It will be noted from FIG. 1 that, thus elastically mounted on the carrier arm 22, the shield 50 covers the aperture 42 in the carrier arm and so serves to shield the upper transducer head 18.

The mass of the shield 50 must of course be less than that of the carrier arm 22 for effectively reducing its audible vibration. For the best results the weight of the shield 50 is approximately 1.5 grams whereas the total weight of the carrier arm 22, upper transducer head 18, upper gimbal spring 44, and cantilever spring 38 is approximately 4.0 grams.

Given below by way of example are the approximate dimensions, in millimeters, of the carrier arm 22, shield 50, and elastic bodies 52:

| Carrier arm 22: | |
| --- | --- |
| length | 43.5 |
| thickness | 3.0 |
| Shield 50: | |
| thickness | 0.2 |
| dimension of flat portion 54 in transverse direction of carrier arm 22 | 14.0 |
| dimension of flat portion 54 in longitudinal direction of carrier arm 22 | 16.5 |
| height of each side rim 56 | 4.0 |
| Elastic bodies 52: | |
| height | 2.0 |
| dimension in transverse direction of carrier arm 22 | 3.0 |
| dimension in longitudinal direction of carrier arm 22 | 7.5 |

For further constructional and operational details of this data transfer apparatus, reference may be had to the aforementioned Noda U.S. patent application Ser. No. 434,400. We believe that we have disclosed our invention in sufficient detail to make clear how we have succeeded in dampening the audible resonant vibration of the carrier arm 22 as well as other means mounted thereon. Elastically mounted on the carrier arm, the metal-made shield 50 serves not only to mitigate its vibration but also to shield the upper transducer head by being disposed thereover. We have thus made utmost use of the existing parts of the apparatus in attaining the vibration dampening objective.

Although we have shown and described our invention in terms of but one embodiment thereof, we understand, of course, that our invention is not to be limited by the exact details of the illustrated embodiment. The following is a brief list of possible modifications of the invention:

1. The metal-made shield 50 may be supported by other than two elastic bodies.
2. The metal-made shield 50 need not be of inverted U shaped cross section but may, for example, be exactly flat.
3. The shield 50 may be made from metals other than Permalloy, such for example as silicon steel, or may be a laminate of, for example, Permalloy and aluminum.
4. If the transducer heads need not be shielded by the vibration control system 48, the shield 50 may be replaced by a member of nonmetallic material such as plastics having greater rigidity than the material used for elastically supporting the same on the carrier arm 22.
5. The carrier arm 22 may be biased toward the carriage 20 by a coil spring, torsion spring, or like resilient means, rather than by the cantilever spring 38.
6. The lower transducer head 16 may not be gimbal mounted but may be supported in substantially fixed relation to the carriage 20.

All these and other modifications or alterations of our invention are intended in the foregoing disclosure; therefore, our invention is to be limited only by the terms of the claims which follow.

We claim:

1. In a data transfer apparatus for use with a thin flexible magnetic disk having magnetic recording surfaces on both sides thereof, in combination:
   (a) a carriage movable substantially radially of the magnetic disk;
   (b) a first transducer head mounted on the carriage for movement therewith in data transducing contact with one recording surface of the magnetic disk;
   (c) a second transducer head disposed opposite to the first transducer head and on the opposite side of the magnetic disk with respect to the first transducer head;
   (d) resilient means including a cantilever spring;
   (e) a carrier arm of rigid material carrying the second transducer head and mounted to the carriage via the cantilever spring for joint movement with the carriage, the resilient means acting on the rigid carrier arm to bias the second transducer head into data transducing contact with the other recording surface of the magnetic disk;
   (f) an elastic mount bonded to the rigid carrier arm and adapted to dampen inherent vibration in said apparatus by virtue of volumetric change in said elastic mount; and
   (g) a member of rigid material floatingly mounted on the rigid carrier arm via the elastic mount by being bonded to the latter;
   (h) the floating rigid member and the elastic mount serving in combination to dampen the resonant vibration of the rigid carrier arm due to the data transducing contact of the transducer heads with the magnetic disk.

2. The data transfer apparatus of claim 1 wherein the floating rigid member is a generally flat member of metal serving also as a shield for the second transducer head.

3. The data transfer apparatus of claim 2 wherein the elastic mount comprises a plurality of bodies of elastic material, each capable of volumetric change, bonded to the rigid carrier arm in spaced apart positions thereon and having the floating rigid member bonded thereto.

4. The data transfer apparatus of claim 2 wherein the floating rigid member has a pair of opposed side rims bent right angularly therefrom and bonded to the elastic mount.

5. The data transfer apparatus of claim 4 wherein the elastic mount comprises a pair of bodies of elastic material, each capable of volumetric change, bonded to the rigid carrier arm in spaced apart positions thereon, and wherein the floating rigid member is further formed to include a pair of lugs projecting from the respective side rims thereof away from each other to be bonded to the respective bodies of elastic material.

6. The data transfer apparatus of claim 1 wherein the elastic mount is made of neoprene.

7. The data transfer apparatus of claim 1 wherein the first and second transducer heads are mounted on the carriage and the carrier arm respectively via first and second springs, respectively, the first spring being heavier than the second spring.

8. The data transfer apparatus of claim 1 wherein at least the second of the first and second transducer heads is mounted via a gimbal spring on the carrier arm.

9. The data transfer apparatus of claim 1 wherein the rigid carrier arm is made of polyphenylene sulfide.

10. A data transfer apparatus for use with a thin flexible magnetic disk having magnetic recording surfaces on both sides thereof, the apparatus comprising:
   (a) means for imparting rotation to the magnetic disk;
   (b) a carriage;
   (c) means for moving the carriage substantially radially of the magnetic disk;

(d) first and second head springs;
(e) a first transducer head mounted on the carriage via the first head spring for movement with the carriage in data transducing contact with one recording surface of the magnetic disk;
(f) resilient means including a cantilever spring;
(g) a carrier arm of rigid material pivotally mounted to the carriage by having a proximal end thereof coupled to the cantilever spring, the rigid carrier arm being movable jointly with the carriage;
(h) a second transducer head mounted on the rigid carrier arm, in the adjacency of a distal end thereof, via the second head spring and disposed opposite to the first transducer head and on the opposite side of the magnetic disk with respect to the transducer head, the resilient means including the cantilever spring acting on the rigid carrier arm to bias the second transducer head into data transducing contact with the other recording surface of the magnetic disk;
(i) an elastic mount bonded adjacent to the distal end of the rigid carrier arm and adapted to dampen inherent vibration in said apparatus by virtue of volumetric change in said elastic mount; and
(j) a member of rigid material floatingly mounted on the rigid carrier arm via the elastic mount by being bonded to the latter;
(k) the floating rigid member and the elastic mount serving in combination to dampen the resonant vibration of the rigid carrier arm due to the data transducing contact of the transducer heads with the magnetic disk.

11. The data transfer apparatus of claim 10 wherein the total weight of the rigid carrier arm, the cantilever spring, the second transducer head, and the second head spring is approximately four grams whereas the weight of the floating rigid member is approximately 1.5 grams.

* * * * *